US011905660B2

(12) United States Patent
Gingras et al.

(10) Patent No.: US 11,905,660 B2
(45) Date of Patent: Feb. 20, 2024

(54) DEFLAKER WITH SERRATED TOOTH PATTERN

(71) Applicant: ANDRITZ INC., Alpharetta, GA (US)

(72) Inventors: Luc Gingras, Harrogate (GB); Ismo Ihalainen, Chester (GB)

(73) Assignee: ANDRITZ INC., Alpharetta, GA (US)

( * ) Notice: Subject to any disclaimer, the term of this patent is extended or adjusted under 35 U.S.C. 154(b) by 0 days.

(21) Appl. No.: 17/989,428

(22) Filed: Nov. 17, 2022

(65) Prior Publication Data

US 2023/0167605 A1 Jun. 1, 2023

Related U.S. Application Data

(60) Provisional application No. 63/284,807, filed on Dec. 1, 2021.

(51) Int. Cl.
*D21D 1/30* (2006.01)
*B03B 5/64* (2006.01)
*D21D 1/22* (2006.01)

(52) U.S. Cl.
CPC ............... *D21D 1/306* (2013.01); *B03B 5/64* (2013.01); *D21D 1/22* (2013.01)

(58) Field of Classification Search
CPC ...................................................... D21D 1/306
See application file for complete search history.

(56) References Cited

U.S. PATENT DOCUMENTS

| | | | | |
|---|---|---|---|---|
| 9,643,336 | B1 * | 5/2017 | Krivohlavek | B01F 27/813 |
| 2007/0158484 | A1 * | 7/2007 | Gingras | D21D 1/006 241/296 |
| 2010/0269991 | A1 * | 10/2010 | Antensteiner | D21D 1/008 164/47 |
| 2021/0123482 | A1 * | 4/2021 | Kobayashi | F16D 13/52 |

FOREIGN PATENT DOCUMENTS

| | | | |
|---|---|---|---|
| EP | 2243879 | A2 | 10/2010 |
| EP | 3663461 | A1 | 6/2020 |

OTHER PUBLICATIONS

International Application No. PCT/US2022/050288, International Search Report and Written Opinion dated Mar. 27, 2023, 10 pages.

* cited by examiner

*Primary Examiner* — Jacob S. Scott
*Assistant Examiner* — Miraj T. Patel
(74) *Attorney, Agent, or Firm* — Kilpatrick Townsend & Stockton LLP

(57) ABSTRACT

A deflaker plate for a deflaker machine may include a substrate and a plurality of teeth extending from the substrate, wherein a specified number of teeth of the plurality of teeth have a serrated face.

18 Claims, 8 Drawing Sheets

DEFLAKER WITH SERRATED TOOTH PATTERN

CROSS-REFERENCES TO RELATED APPLICATIONS

This application claims the benefit of U.S. Provisional Application No. 63/284,807, filed Dec. 1, 2021, the contents of which are hereby incorporated herein by reference in their entirety.

BACKGROUND

Unless otherwise indicated herein, the materials described in this section are not prior art to the claims in this application and are not admitted to being prior art by inclusion in this section.

Deflakers are used in the recycling process of papers and in separation of broke, dried pulp sheets, and pulp bales. The recycling process typically starts with a pulper that reduces the raw material into smaller particles (e.g., flakes) and some amount of individual fibers. Pulpers are used as a first step to ensure particle size will not cause plugging of subsequent equipment such as the deflakers, but they are inefficient in terms of energy consumption. The deflaker usually follows the pulping process. The deflaker takes the raw material from the pulper and reduces the flake content from a range between 30% and 90% down to levels below 5% and ideally below 1%. Depending on the grade of paper there may be a need to use multiple deflakers in series to achieve the required flake reduction efficiency. Furnish (e.g., stock) containing flakes is inadequate for paper making as it would generate a poor formation and a mottled paper.

Deflaker plates use rows of intermeshing teeth which can be arranged as concentric rings for a disk deflaker, or a combination of rotor and stator stepped cones for a conical deflaker that also provide a similar dynamic effect on flakes. The intermeshing edges and surfaces of the teeth are linear, straight, and relatively smooth. The operating gap between the intermeshing surfaces is usually in the order of around 1 mm. This configuration results in some of the mechanical energy being transferred to flakes and their separation, but also some energy is also applied to individual fibers, which will absorb this extra energy causing fiber transformation—something that is normally not desirable during the deflaking operation.

FIG. 1 is a diagram illustrating a conventional rotor plate and stator plate configuration of a disk-type deflaking machine. Referring to FIG. 1, the stator 110 is a stationary element while the rotor 120 is driven by the rotor shaft 130 of the deflaking machine 100 and rotates with respect to the stator 110. A stator plate 115 may be coupled to the stator 110. In some implementations, the stator plate 115 115 may be a single piece circular disk. In some implementations, the stator plate 115 may be formed from a series of individually machined concentric rings 116*a*-116*c*. While three concentric rings are illustrated in FIG. 1, the stator plate may include more or fewer concentric rings without departing from the scope of the present disclosure. In some implementations, the stator plate 115 may include a set of stator plate segments assembled on the stator 110 to form a circular disk. The stator teeth 151 may be formed, for example by milling or other machining operations, in concentric circles around the circular stator disk.

A rotor plate 125 may be coupled to the rotor 120. In some implementations, the rotor plate 125 may be a single piece circular disk. In some implementations, the rotor plate 125 may be formed from a series of individually machined concentric rings 126*a*-126*c*. While three concentric rings are illustrated in FIG. 1, the rotor plate may include more or fewer concentric rings without departing from the scope of the present disclosure. In some implementations, the rotor plate 125 may include a set of rotor plate segments assembled on the rotor 120 to form a circular disk. The rotor teeth 152 may be formed, for example by milling or other machining operations, in concentric circles around the circular rotor disk. The stator teeth 151 on the stator plate 115 and the rotor teeth 152 on the rotor plate 125 may form concentric rings of intermeshing teeth 150 to provide the deflaking effect. A gap 155 may be formed between the intermeshing teeth 150 through which the pulp may flow to be deflaked.

FIG. 2 is a diagram illustrating a conventional rotor cone and stator cone configuration of a conical deflaking machine. Referring to FIG. 2, the conical stator 210 is a stationary element while the conical rotor 220 is driven by the rotor shaft (not shown) of the conical deflaking machine 200 and rotates around the axis of rotation 205 of the rotor shaft with respect to the conical stator 210. A stepped stator cone 215 may be coupled to the conical stator 210. In some implementations, the stator cone 215 may be a single piece cone. The single piece stator cone 215 may be, for example, but not limited to, a single piece casting, a computer numerical control (CNC) machined cone, a welded assembly, etc. In some implementations, the stator cone 215 may include a set of stator plate segments assembled on the conical stator 210 to form a cone.

A stepped rotor cone 225 may be coupled to the conical rotor 220. In some implementations, the rotor cone 225 may be a single piece cone. The single piece rotor cone 225 may be, for example, but not limited to, a single piece casting, a computer numerical control (CNC) machined cone, a welded assembly, etc. In some implementations, the rotor cone 225 may include a set of rotor plate segments assembled on the conical rotor 220 to form a cone. The stator cone 215 and the rotor cone 225 may have intermeshing teeth 250 to provide the deflaking effect. A gap 255 may be formed between the intermeshing teeth 250 through which the pulp may flow to be deflaked.

SUMMARY

Rotor and stator deflaker plates having novel deflaker tooth patterns applicable for both disk and conical deflaking machines are provided.

According to various aspects there is provided a deflaker plate for a deflaker machine. In some aspects, the deflaker plate may include a substrate and a plurality of teeth extending from the substrate, wherein a specified number of teeth of the plurality of teeth have a serrated face.

According to various aspects there is provided deflaker plates for a deflaker machine. In some aspects, the deflaker plates may include: a first deflaker plate and a second deflaker plate. The first deflaker plate may include a first substrate and a first plurality of teeth extending from the first substrate. A first specified number of teeth of the first plurality of teeth may have a serrated face. The second deflaker plate may include a second substrate and a second plurality of teeth extending from the second substrate. A second specified number of teeth of the second plurality of teeth may have a serrated face. The first plurality of teeth may be configured to intermesh with the second plurality of teeth.

Numerous benefits are achieved by way of the various embodiments over conventional techniques. For example, the various embodiments provide deflaker plates for a deflaking machine having deflaker tooth patterns that can reduce the amount of energy directed into fiber refining (e.g., refining energy), while maintaining or improving the deflaking efficiency. In some embodiments, a specified number of teeth of a plurality of teeth of the deflaker plate have a serrated face. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

Figure 1:
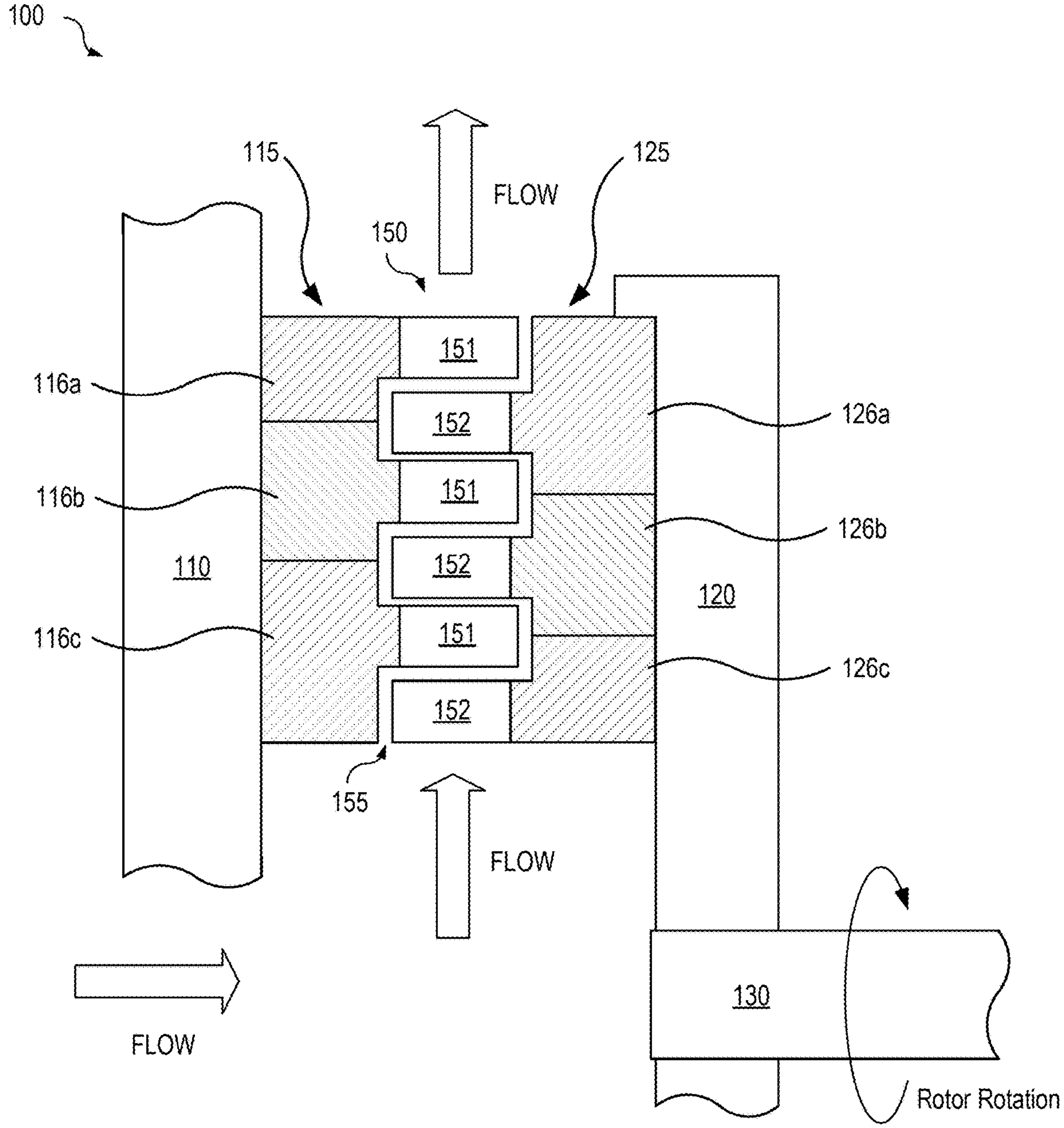
Related Art FIG. 1
FIG. 1 is a diagram illustrating a conventional rotor plate and stator plate configuration of a disk-type deflaking machine.
Figure 2:
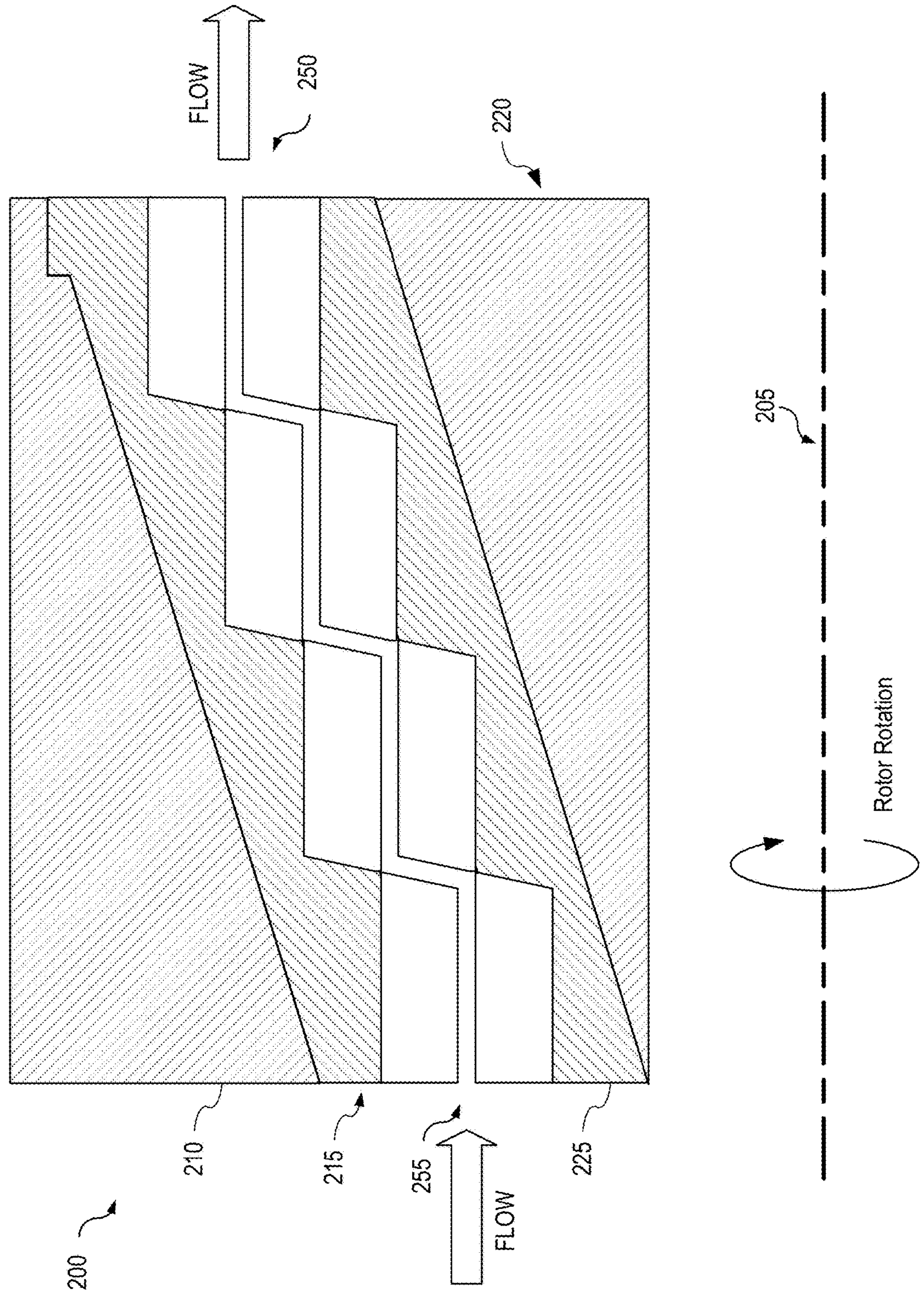
Related Art FIG. 2
FIG. 2 is a diagram illustrating a conventional rotor cone and stator cone configuration of a conical deflaking machine.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms “a,” “an,” and “the,” as used in the specification and the appended claims include plural references unless the context clearly dictates otherwise; (c) the antecedent term “about” applied to a recited range or value denotes an approximation within the deviation in the range or values known or expected in the art from the measurements; (d) the words “herein,” “hereby,” “hereto,” “hereinbefore,” and “hereinafter,” and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) “or” and “any” are not exclusive and “include” and “including” are not limiting. Further, the terms, “comprising,” “having,” “including,” and “containing” are to be construed as open-ended terms (i.e., meaning “including but not limited to”).

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

Deflakers may be disk or conical machines featuring rows of intermeshing teeth that operate at high speed in order to generate maximum shear forces to separate flakes of recycled paper pulp. Deflaker plates use rows of intermeshing teeth which can be formed as concentric rings for a disk deflaker, or a combination of rotor and stator stepped cones or truncated stepped cones for a conical deflaker that also provide a similar dynamic effect on flakes. The deflakers operate at consistencies generally between 2% and 6%, and typical gaps between the crossing rows of teeth on the stator and rotor plates or cones are in the order of approximately 1 mm (0.5-2.0 mm). To achieve the best possible flake separation efficiency while minimizing the amount of energy (e.g., refining energy) imparted to individual fibers, the gap between the deflaker plates of the rotor and stator may be adjusted. However, if the gap is increased, the amount of refining energy may be decreased, but the deflaking effect also decreases. The decrease in deflaking effect can result in the need for more deflaking stages which would consume more overall energy as there are substantial losses due to pumping in each deflaker.

According to aspects of the present disclosure, novel deflaker tooth patterns applicable for both disk and conical deflaking machines are provided. The deflaker tooth patterns according to the present disclosure can reduce the amount of energy directed into fiber refining (e.g., refining energy), while maintaining or improving the deflaking efficiency. In addition, hydraulic frictional losses may be reduced resulting in less energy consumed for a given flake reduction performance (e.g., deflaking efficiency).

Aspects of the present disclosure provide a serrated surface on the teeth of the deflaker plates or deflaker cones. The term "conical" as used herein refers to both cones and truncated cones. The peaks and valleys of the serrated teeth may be formed at sharp angles. The serrated tooth surfaces can create a different gap condition and mechanical deflaking action. The serrated surfaces can catch the pulp flakes with the peaks on the surface and edges of the teeth to shear the flakes apart. Individual pulp fibers have a low probability of being caught by the sharp peaks and a lower probability of being treated in a scissor-type action of a crossing with an opposing sharp peak.

Figure 3A:
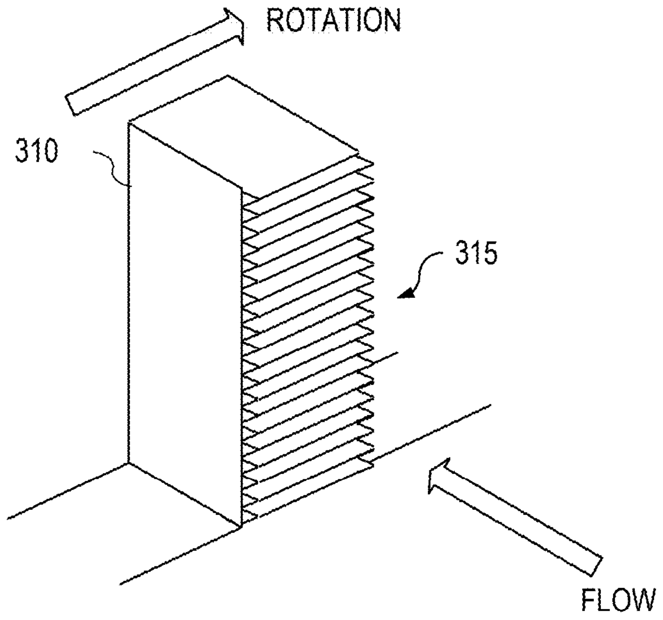
FIG. 3A is a perspective view illustrating an example of a serrated tooth having linear serrations for a deflaker plate according to some aspects of the present disclosure.

FIG. 3A is a perspective view illustrating an example of a serrated tooth 310 having linear serrations for a deflaker plate according to some aspects of the present disclosure. The deflaker plate may be a stator plate or a rotor plate or may be a stator segment or a rotor segment. As illustrated in FIG. 3A, the serrated tooth 310 has peaks and valleys 315 extending linearly across the face of the tooth at a specified linear pitch. In some implementations, only a portion of the tooth face may include serrations. The serrated tooth face of a rotor plate or a stator plate may be disposed opposite a face of a tooth on an opposing stator plate or rotor plate, respectively, when installed in a deflaker machine.

Figure 3B:
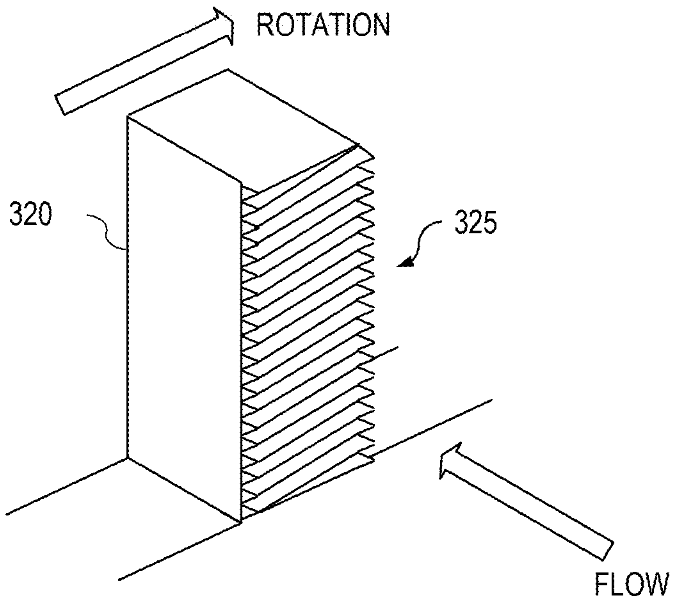
FIG. 3B is a perspective view illustrating an example of a serrated tooth having screw thread type serrations for a deflaker plate according to some aspects of the present disclosure.

FIG. 3B is a perspective view illustrating an example of a serrated tooth 320 having screw thread type serrations for a deflaker plate according to some aspects of the present disclosure. As illustrated in FIG. 3B, the serrated tooth 320 has peaks and valleys 325 extending across the face of the tooth at a specified thread pitch. In some implementations, only a portion of the tooth face may include serrations. The serrated tooth face of a rotor plate or a stator plate may be disposed opposite a face of a tooth on an opposing stator plate or rotor plate, respectively, when installed in a deflaker machine.

Figure 4A:
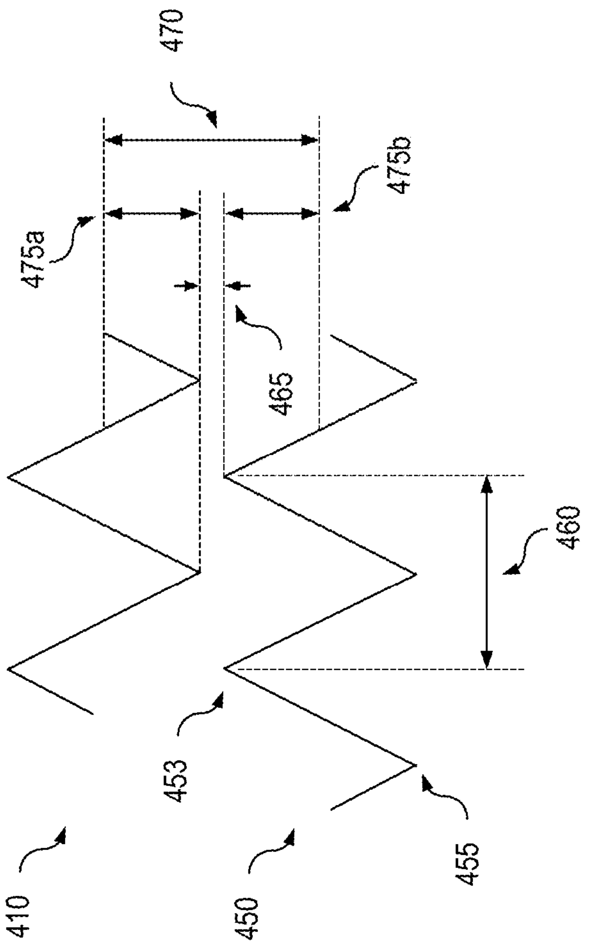
FIG. 4A is a diagram illustrating an example of serrations on the face of a serrated tooth for a stator plate and a rotor plate according to some aspects of the present disclosure.
Figure 4B:
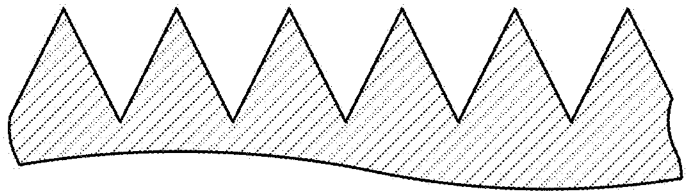
FIGS. 4B-4H illustrate examples of serration pattern profiles that may be used in various implementations according to some aspects of the present disclosure.
Figure 4C:
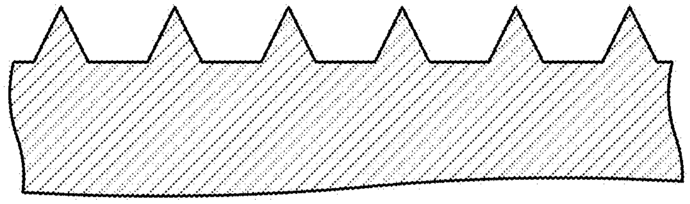
Figure 4D:
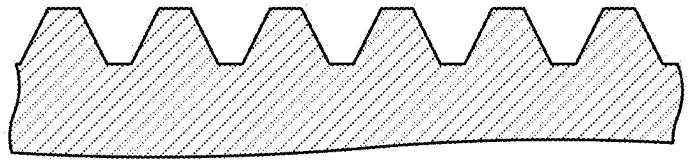
Figure 4E:
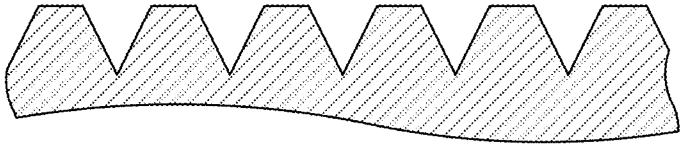
Figure 4F:
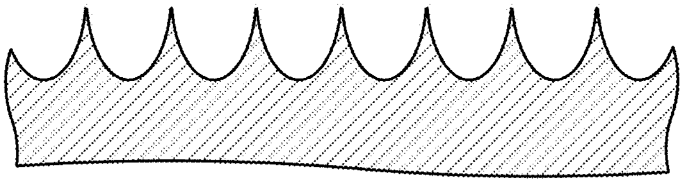
Figure 4G:
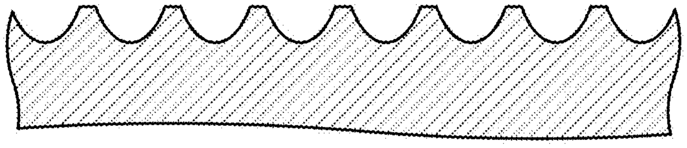
Figure 4H:
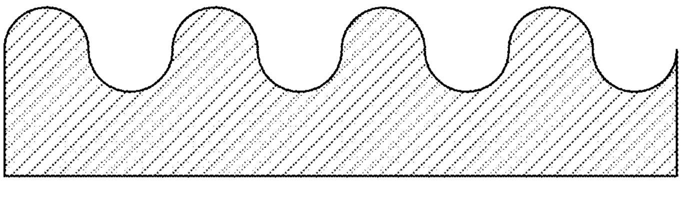

FIG. 4A is a diagram illustrating an example of serrations on the face of a serrated tooth for a stator plate 410 and a rotor plate 450 according to some aspects of the present disclosure. The peaks 453 and valleys 455 of the serrated teeth may be formed at acute angles. In some implementations, a surface hardening treatment of the deflaking surface of the teeth may be provided. The surface hardening treatment may be beneficial in keeping the peaks sharp throughout the life of the deflaker plates. In some cases, the surface hardening treatment may be applied to the teeth of the stator plate 410 and/or the rotor plate 450. In some cases, the surface hardening treatment may be applied to the entire stator plate 410 and/or the entire rotor plate 450.

The peaks and valleys may form serration patterns having have different configurations, for example, but not limited to, linear, curved, circular, angled, cross-hatched, etc., serration patterns. FIGS. 4B-4H illustrate examples of serration pattern profiles that may be used in various implementations according to some aspects of the present disclosure. As illustrated in FIGS. 4B-4H, the of the teeth of the serration profiles may have sharp points, (e.g., FIGS. 4B, 4C, 4F), flat tops (e.g., FIGS. 4D, 4E, 4G), rounded tops (e.g., FIG. 4H), or combinations thereof. It should be appreciated that the serration patterns illustrated in FIGS. 4B-4H are nonlimiting examples and that other serration patterns may be used without departing from the scope of the present disclosure.

In some implementations, the serrations may be formed at an angle with respect to the substrate across the face of the deflaker teeth. In some implementations, the pattern of peaks and valleys may be formed similar to a screw thread around the tooth, providing a substantially homogeneous distribution of peaks and valleys at all positions along a tooth surface. In some implementations, only a portion of the tooth face may include serrations.

Referring again to FIG. 4A, the serrated to surface may include peaks 453 and valleys 455 having a specified pitch (e.g., distance between peaks) 460, for example, a pitch in a range of 0.5-3.0 mm. The average gap 470 affecting the pulp fibers may be formed by the operating gap 465 plus half of the combined depth 475*a*, 475*b* of the valleys of the serrated teeth.

Figure 5A:
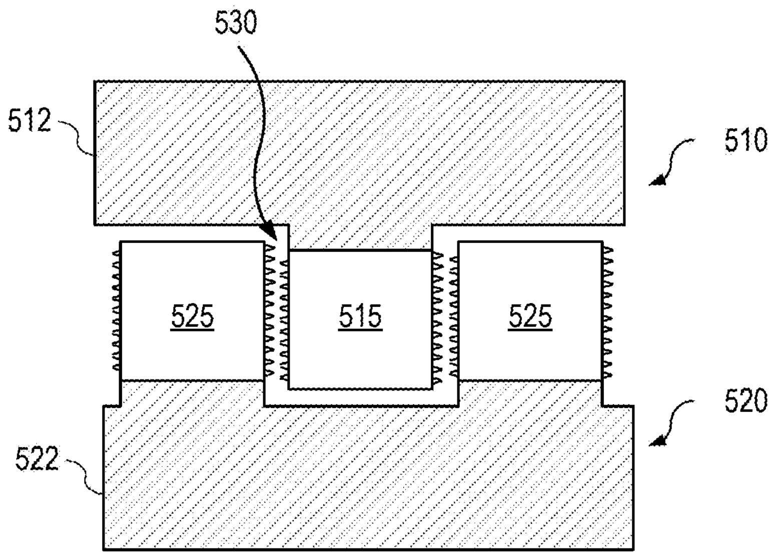
FIG. 5A is a diagram illustrating an example of disk deflaker plates having serrated teeth according to some aspects of the present disclosure.

FIG. 5A is a diagram illustrating an example of disk deflaker plates having serrated teeth 515, 525 according to some aspects of the present disclosure. Referring to FIG. 5A, the stator plate 510 may include a substrate 512 and serrated teeth 515 extending from the substrate 512. In some implementations, the substrate may be a disk, a segment of a disk, or a ring. The rotor plate 520 may include a substrate 522 and serrated teeth 525 extending from the substrate 522. The serrated teeth 515 of the stator plate 510 may be intermeshed with the serrated teeth 525 of the rotor plate 520. In some implementations, only a portion of the tooth face of the rotor plate and/or the stator plate may include serrations. An operating gap 530 may be provided between the peaks of the serrated teeth 515 of the stator plate 510 and the serrated teeth 525 of the rotor plate 520. See also the operating gap 465 in FIG. 4

Figure 5B:
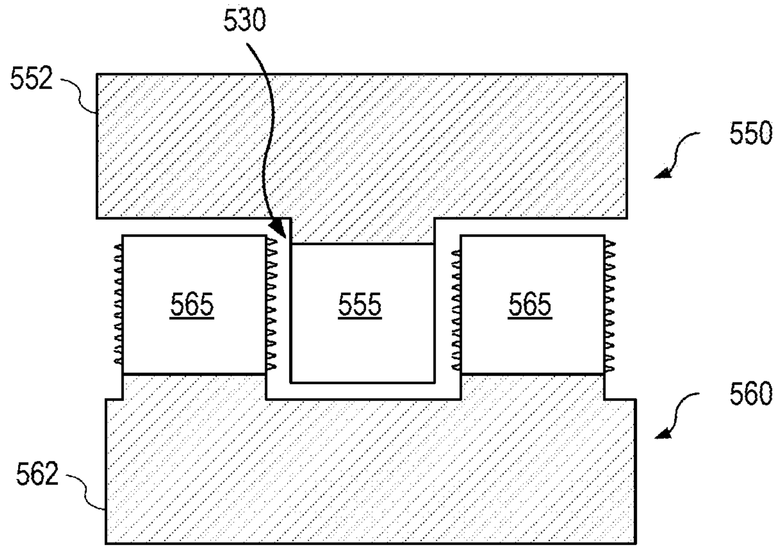
FIG. 5B is a diagram illustrating an example of disk deflaker plates with only one deflaker plate having serrated teeth according to some aspects of the present disclosure.

FIG. 5B is a diagram illustrating an example of disk deflaker plates with only one deflaker plate having serrated teeth according to some aspects of the present disclosure. As shown in FIG. 5B, the stator plate 550 may include a substrate 552 and teeth 555 extending from the substrate 552. The rotor plate 560 may include a substrate 562 and serrated teeth 565 extending from the substrate 562. The teeth 555 of the stator plate 550 may not have serrations, while the teeth 565 of the rotor plate 560 may have serrations. An operating gap 570 may be provided between the faces of the non-serrated teeth 555 of the stator plate 510 and the peaks of the serrated teeth 565 rotor plate.

In some implementations, both the rotor plate and the stator plate may have serrated teeth. In some implementations, only the rotor plate or the stator plate may have serrated teeth. In some implementations, each tooth on the rotor plate and/or the stator plate may have serrations. In some implementations, only a portion of the teeth on the rotor plate and/or the stator plate may have serrations. In some implementations, only a portion of the tooth face on the rotor plate and/or the stator plate may include serrations.

According to some aspects of the present disclosure, serrated teeth may be provided for stator and rotor deflaker cones of a conical deflaker. The stator and rotor deflaker cones may be formed from conical plate segments or may be single piece cones. The stator and rotor deflaker cones may be stepped cones. In some implementations, the stepped cones may be angled stepped cones. Similar to the deflaker plates described with respect to FIGS. 3A, 3B, and 4, the serrated teeth may have peaks and valleys extending linearly across the face of the tooth at a specified linear pitch. The serrated tooth face of a rotor plate or a stator plate may be disposed opposite a face of a tooth on an opposing stator plate or rotor plate, respectively, when installed in a deflaker machine.

In some implementations, a surface hardening treatment of the deflaking surface of the teeth may be provided. The surface hardening treatment may be beneficial in keeping the peaks sharp throughout the life of the deflaker plates. The peaks and valleys may form serration patterns having have different configurations, for example, but not limited to, linear, curved, circular, angled, cross-hatched, etc., serration patterns. In some implementations, the serrations may be formed at an angle with respect to the substrate across the face of the deflaker teeth. In some implementations, the pattern of peaks and valleys may be formed similar to a screw thread around the tooth, providing a substantially homogeneous distribution of peaks and valleys at all positions along a tooth surface.

Figure 6A:
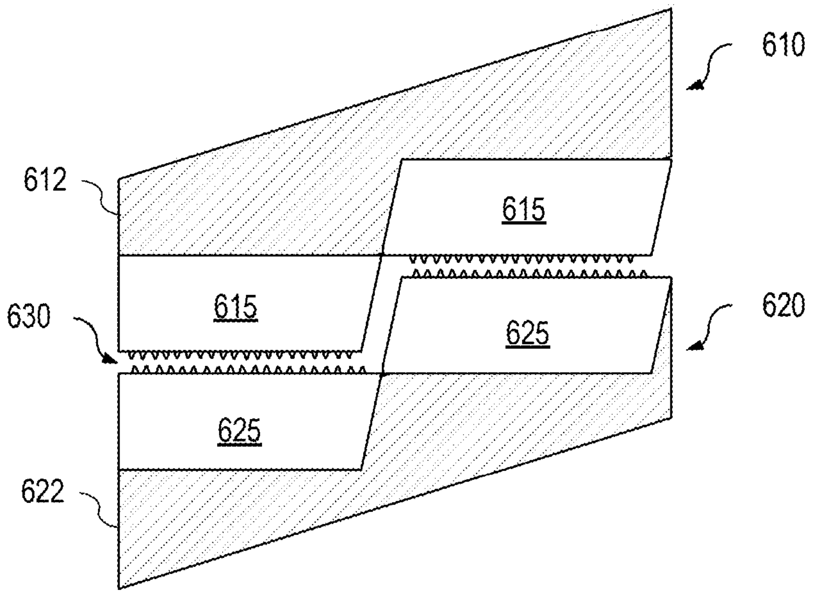
FIG. 6A is a diagram illustrating an example of deflaker cones having serrated teeth according to some aspects of the present disclosure.

FIG. 6A is a diagram illustrating an example of deflaker cones having serrated teeth according to some aspects of the present disclosure. Referring to FIG. 6A, the stator cone 610 may include a stepped cone substrate 612 and serrated teeth 615 extending from the stepped cone substrate 612. The rotor cone 620 may include a stepped cone substrate 622 and serrated teeth 625 extending from the stepped cone substrate 622. In some implementations, the substrate of the rotor cone and/or the stator cone may be a cone, a segmented cone, or a segment of a stepped cone. In some implementations, only a portion of the tooth face on the rotor cone and/or the stator cone may include serrations. The serrated teeth 615 of the stepped stator cone 610 may be intermeshed with the serrated teeth 625 of the stepped rotor cone 620. An operating gap 630 may be provided between the peaks of the serrated teeth 615, 625 of the stator cone 610 and the rotor cone 620.

Figure 6B:
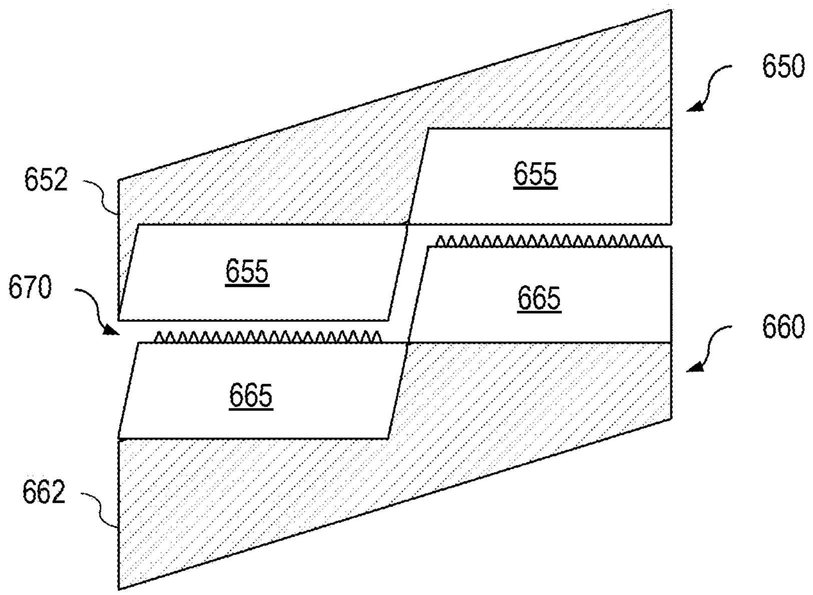
FIG. 6B is a diagram illustrating an example of deflaker cones with only one deflaker cone having serrated teeth according to some aspects of the present disclosure.

FIG. 6B is a diagram illustrating an example of deflaker cones with only one deflaker cone having serrated teeth according to some aspects of the present disclosure. As shown in FIG. 6B, the stator cone 650 may include a stepped cone substrate 652 and teeth 655 extending from the stepped cone substrate 652. The teeth 655 of the stator cone 650 may not have serrations. The rotor cone 660 may be a include a stepped cone substrate 662 and serrated teeth 665 extending from the stepped cone substrate 662. In some implementations, only a portion of the tooth face may include serrations. The serrated teeth 655 of the stepped stator cone 650 may be intermeshed with the non-serrated teeth 665 of the stepped rotor cone 660. An operating gap 670 may be provided between the faces of non-serrated teeth 655 of the rotor cone 660 and the peaks of the serrated teeth 665 stator cone 650.

In some implementations, both the rotor cone and the stator cone may have serrated teeth. In some implementations, only the rotor cone or the stator cone may have serrated teeth. In some implementations, each tooth on the rotor cone and/or the stator cone may have serrations. In some implementations, only a portion of the teeth on the rotor cone and/or the stator cone may have serrations. In some implementations, only a portion of the tooth face on the rotor cone and/or the stator cone may include serrations.

The serrated tooth surfaces and edges properties of the stator and rotor plates and cones according to the present disclosure may improve the deflaking efficiency. Large flake sizes will easily be caught by the multiple peaks of the serrated surface; but the energy going into fiber refining, as well as hydraulic shear losses between passing teeth may be reduced. The operating gap between the intermeshing teeth may be reduced, resulting in improved flake removal efficiency in a single pass without increasing the energy losses due to fiber refining and hydraulic shear losses The examples and embodiments described herein are for illustrative purposes only. One of ordinary skill in the art will appreciate that these configuration as well as other variations of the disclosed configurations may be used without departing from the scope of the present disclosure.

What is claimed is:

1. A deflaker plate for a deflaker machine, the deflaker plate comprising:
- a substrate including a surface; and
- a plurality of teeth extending from the surface of the substrate,
- wherein a specified number of teeth of the plurality of teeth each comprises a serrated face,
- wherein serrations on the serrated face have peaks and valleys,
- wherein each of the peaks and valleys are directed across the serrated face in a direction of rotation of the deflaker plate, and
- wherein each of the peaks and valleys are oriented to either be parallel with the surface of the substrate or define an acute angle relative to the surface of the substrate.

2. The deflaker plate of claim 1, wherein the serrations comprise a serration pattern having a specified screw thread pitch or a specified linear pitch.

3. The deflaker plate of claim 1, wherein less than an entire portion of the serrated face comprises serrations.

4. The deflaker plate of claim 1, wherein the specified number of teeth having the serrated face comprises all of the teeth of the plurality of teeth.

5. The deflaker plate of claim 1, wherein the specified number of teeth having the serrated face comprises less than all of the teeth of the plurality of teeth.

6. The deflaker plate of claim 1, wherein the substrate is a disk, a ring, or a segment of a disk.

7. The deflaker plate of claim 1, wherein the substrate is a cone, segmented cone, stepped cone or a segment of a stepped cone.

8. The deflaker plate of claim 1, further comprising a surface hardening treatment applied to the plurality of teeth.

9. Deflaker plates for a deflaker machine, the deflaker plates comprising:
- a first deflaker plate comprising:
  - a first substrate including a surface; and
  - a first plurality of teeth extending from the surface of the first substrate,
  - wherein a first specified number of teeth of the first plurality of teeth each comprises a serrated face,
  - wherein serrations on the serrated face have peaks and valleys,
  - wherein each of the peaks and valleys are directed across the serrated face in a direction of rotation of the first deflaker plate, and
  - wherein each of the peaks and valleys are oriented to either be parallel with the surface of the first substrate or define an acute angle relative to the surface of the first substrate; and
- a second deflaker plate comprising:
- a second substrate including a surface; and
- a second plurality of teeth extending from the surface of the second substrate,
  - wherein a second specified number of teeth of the second plurality of teeth each comprises a serrated face,
  - wherein serrations on the serrated face have peaks and valleys,
  - wherein each of the peaks and valleys are directed across the serrated face in the direction of rotation of the first deflaker plate;
  - wherein each of the peaks and valleys are oriented to either be parallel with the surface of the second substrate or define an acute angle relative to the surface of the second substrate, and wherein the first plurality of teeth is configured to intermesh with the second plurality of teeth.

10. The deflaker plates of claim 9, wherein the serrations of the first specified number of teeth and the second specified number of teeth comprise a serration pattern having a specified screw thread pitch or a specified linear pitch.

11. The deflaker plates of claim 9, wherein less than an entire portion of the serrated face of the first specified number of teeth or the second specified number of teeth comprises serrations.

12. The deflaker plates of claim 9, wherein the first specified number of teeth and the second specified number of teeth having the serrated face comprises all the teeth of the first and second plurality of teeth.

13. The deflaker plates of claim 9, wherein the first specified number of teeth and the second specified number of teeth having the serrated face comprises less than all of the teeth of the first and second plurality of teeth.

14. The deflaker plates of claim 9, wherein the first specified number of teeth having the serrated face comprises all the teeth of the first plurality of teeth, and wherein the second specified number of teeth having the serrated face comprises less than all the teeth of the second plurality of teeth.

15. The deflaker plates of claim 9, wherein the first specified number of teeth having the serrated face comprises less than all the teeth of the first plurality of teeth, and wherein the second specified number of teeth having the serrated face comprises all the teeth of the second plurality of teeth.

16. The deflaker plates of claim 9, wherein the first substrate and the second substrate are disks, rings, or segments of disks.

17. The deflaker plates of claim 9, wherein the first substrate and the second substrate are cones, segmented cones, stepped cones or segments of stepped cones.

18. The deflaker plates of claim 9, further comprising a surface hardening treatment applied to the first plurality of teeth or the second plurality of teeth or both the first and second plurality of teeth.

* * * * *